US011932746B2

(12) United States Patent
Hill et al.

(10) Patent No.: US 11,932,746 B2
(45) Date of Patent: Mar. 19, 2024

(54) COMPOSITION

(71) Applicant: SI GROUP USA (USAA), LLC, Danbury, CT (US)

(72) Inventors: Jonathan Hill, Trafford Park (GB); Siren Tan, Trafford Park (GB); Christopher Rider, Trafford Park (GB)

(73) Assignee: SI Group, Inc., The Woodlands, TX (US)

( * ) Notice: Subject to any disclaimer, the term of this patent is extended or adjusted under 35 U.S.C. 154(b) by 0 days.

(21) Appl. No.: 15/039,849

(22) PCT Filed: Nov. 25, 2014

(86) PCT No.: PCT/EP2014/075579
§ 371 (c)(1),
(2) Date: May 26, 2016

(87) PCT Pub. No.: WO2015/078877
PCT Pub. Date: Jun. 4, 2015

(65) Prior Publication Data
US 2017/0051128 A1  Feb. 23, 2017

(30) Foreign Application Priority Data

Nov. 27, 2013  (GB) .................................... 1320919

(51) Int. Cl.
| *C08K 5/00* | (2006.01) |
| *B29B 7/88* | (2006.01) |
| *B29C 48/00* | (2019.01) |
| *B29C 48/154* | (2019.01) |
| *B29L 31/34* | (2006.01) |
| *C08K 5/13* | (2006.01) |
| *C08K 5/14* | (2006.01) |
| *C08K 5/36* | (2006.01) |
| *C09K 15/14* | (2006.01) |
| *H01B 3/30* | (2006.01) |
| *H01B 7/28* | (2006.01) |
| *H01B 13/14* | (2006.01) |

(52) U.S. Cl.
CPC ............... *C08K 5/005* (2013.01); *B29B 7/88* (2013.01); *B29C 48/022* (2019.02); *B29C 48/154* (2019.02); *C08K 5/0025* (2013.01); *C08K 5/13* (2013.01); *C08K 5/14* (2013.01); *C08K 5/36* (2013.01); *C09K 15/14* (2013.01); *H01B 3/30* (2013.01); *H01B 7/2813* (2013.01); *H01B 13/148* (2013.01); *B29K 2995/0005* (2013.01); *B29K 2995/0007* (2013.01); *B29L 2031/3462* (2013.01); *C08K 2201/014* (2013.01)

(58) Field of Classification Search
CPC .... C08K 5/005; C08K 2201/014; C08K 5/13; C08K 5/36; C08K 5/37; C08K 5/0025; C08K 5/14; B29B 7/88; B29C 48/022; B29C 48/154; C09K 15/14; H01B 3/30; H01B 7/2813; H01B 13/148; B29K 2995/0005; B29K 2995/0007; B29L 2031/3462

See application file for complete search history.

(56) References Cited

U.S. PATENT DOCUMENTS

| 4,617,230 | A | * | 10/1986 | Shah ........................ D04H 1/64 427/223 |
| 5,164,434 | A | | 11/1992 | Liwak et al. |
| 5,876,492 | A | * | 3/1999 | Malhotra ................ C09D 11/34 106/31.27 |
| 6,180,706 | B1 | | 1/2001 | Keogh et al. |
| 6,187,858 | B1 | | 2/2001 | Tachikawa et al. |
| 6,277,907 | B1 | * | 8/2001 | Gelbin ...................... C08K 3/04 524/196 |
| 6,362,264 | B1 | * | 3/2002 | Bae ......................... C08K 5/098 524/302 |
| 6,586,509 | B1 | | 7/2003 | Bostrom et al. |
| 6,646,035 | B2 | | 11/2003 | Koch et al. |
| 7,452,933 | B2 | | 11/2008 | Song et al. |
| 7,951,859 | B2 | | 5/2011 | Lin et al. |
| 7,985,457 | B2 | | 7/2011 | Steffl et al. |
| 8,367,204 | B2 | | 2/2013 | Uchida et al. |
| 2002/0198344 | A1 | | 12/2002 | Voigt et al. |
| 2003/0045616 | A1 | | 3/2003 | Harald et al. |
| 2005/0049715 | A1 | | 3/2005 | Ito et al. |

(Continued)

FOREIGN PATENT DOCUMENTS

| GB | 796603 | A | * | 6/1958 | ............. A23L 3/349 |
| JP | S62252458 | | | 11/1987 | |

(Continued)

OTHER PUBLICATIONS

Food Compliance Standard EC 1935/2004 (Year: 2016).*
Ciba Irganox 1076, Ciba, Printed Aug. 2009.*
Dilauryl Thipdipropionate, Chemical Book, www.chemicalbook.com/ChemicalProductProperty_EN_CB3712869.htm, retrieved Dec. 23, 2019.*

(Continued)

Primary Examiner — Jennifer A Gillett
(74) Attorney, Agent, or Firm — Dority-Manning, P.A.

(57) ABSTRACT

The present invention relates to stabilising compositions, particularly stabilising compositions which can be used to stabilise insulation or semi-conductive compositions, such as are used for electrically insulating wires and cables. The stabilising composition comprises: a first stabilising component comprising at least one fully hindered phenolic antioxidant; a second stabilising component comprising at least one partially hindered phenolic antioxidant; and a third stabilising component comprising at least one sulphur-containing antioxidant.

6 Claims, No Drawings

(56) References Cited

U.S. PATENT DOCUMENTS

| | | | |
|---|---|---|---|
| 2006/0114283 A1 | 6/2006 | Mizes et al. | |
| 2007/0203278 A1 | 8/2007 | Song et al. | |
| 2009/0043012 A1* | 2/2009 | Easter | C08L 23/06 523/173 |
| 2009/0264567 A1* | 10/2009 | Prins | C08K 5/005 524/289 |
| 2010/0282490 A1* | 11/2010 | Lin | C08K 5/005 174/110 SR |
| 2010/0282492 A1* | 11/2010 | Machl | C08L 23/10 174/120 SR |

FOREIGN PATENT DOCUMENTS

| | | |
|---|---|---|
| JP | 09227862 A | 9/1997 |
| JP | 11315179 A | 11/1999 |
| JP | 2000103906 | 4/2000 |
| JP | 2002083516 | 3/2002 |
| JP | 2007510767 A | 4/2007 |
| JP | 2008539288 A | 11/2008 |
| JP | 2012097217 | 5/2012 |
| WO | 2000/02207 A1 | 1/2000 |
| WO | WO-2007017108 A1 * | 2/2007 ............ C08K 5/005 |

OTHER PUBLICATIONS

Irganox 1141, Chemical Book, www.chemicalbook.com/ChemicalProductProperty_EN_CB6258490.htm.*

Irganox 1141 Datasheet, SpeicalChem, https://polymer-additives.specialchem.com/product/a-basf-irganox-1141.*

Patent Cooperation Treaty International Search Report for International Application No. PCT/EP2014/075579, dated Apr. 6, 2015.

Written Opinion of the International Search Authority for International Application No. PCT/EP2014/075579, dated Apr. 6, 2015.

International Application No. PCT/EP2014/075579, filed Nov. 25, 2014.

Ciba Specialty Chemicals, Irganox 1141 technical datasheet, 1998, 16 pages.

BASF, IRGASTAB MBS11 technical datasheet, Sep. 2010, 4 pages.

Angels , H-W et al, Rubber, 9. Chemicals and Additives, Jun. 15, 2011, 67 pages.

BASF, Written patent opposition, Feb. 15, 2019, 37 pages.

* cited by examiner

COMPOSITION

CROSS REFERENCE TO RELATED APPLICATIONS

This application is a U.S. national phase filing of PCT international patent application No. PCT/EP2014/075579, with a filing date of Nov. 25, 2014, which in turn claims the benefit of British patent application serial number 1320919.2, filed Nov. 27, 2013, the disclosures of which are expressly incorporated by reference.

FIELD

The present invention relates to stabilising compositions. More particularly, but not exclusively, the present invention relates to stabilising compositions which can be used to stabilise insulation compositions, such as are used for electrically insulating wires and cables.

BACKGROUND

Insulation compositions, particularly those used for the electrical insulation of wires and cables, are generally formed from a polymer, for example polyethylene, particularly LDPE. The compositions also typically contain a peroxide crosslinking agent and one or more stabilisers or other functional additives.

Stabilisers are often used to improve the scorch resistance of the insulation composition. Scorch can be described as the premature crosslinking of a polymer which occurs during the polymer extrusion process. Scorch may result in the formation of discoloured gel-like particles in the insulation composition and can lead to an undesirable build-up of pressure during extrusion. Consequently, the quality of the insulated wire or cable is diminished.

Stabilisers are also used in insulation compositions to increase the service life of the insulated wire or cable.

Known types of stabiliser for insulation compositions include phenolic antioxidants, phosphite antioxidants, thio-compounds, aromatic amines and combinations thereof.

US 2002/0198344 describes a polyethylene composition for use as insulation for wire and cable that has improved scorch resistance, comprising a polyethylene, a scorch inhibitor having a melting point below 50° C., at atmospheric pressure, and an organic peroxide. The scorch inhibitor is described as a phenol and/or an aromatic amine.

WO 2006/114283 describes a composition comprising at least one polyolefin; at least one organic peroxide; and an antioxidant mixture of i) at least one fast radical scavenger selected from the group consisting of low hindered phenols, low hindered thiophenols, low hindered thiobisphenols, aliphatic amines, aromatic amines, NOR HALS, hydroxylamines, and mixtures thereof; and ii) at least one long term stabiliser selected from the group consisting of low hindered phenols, highly hindered phenols, thiosynergists, aliphatic amines, aromatic amines, HALS, hydroxylamines, and mixtures thereof.

JP 2010-034513 describes a curable composition containing a photopolymeric monomer, a polymerization initiator, and an antioxidant. The photopolymeric monomer is present in the composition in an amount of 80 to 99% by mass, and the antioxidant is present in an amount of 0.3 to 7% by mass. The antioxidant is selected from the group consisting of a hindered phenol, a semi-hindered phenol, a mixture of the hindered phenol and the semi-hindered phenol, and a hindered amine.

WO 2005/049715 describes a composition for the stabilisation of halogen-containing polymer slurries, comprising a halogen-containing polymer in the form of an aqueous suspension or emulsion, a partially hindered phenolic antioxidant and selected sulphur-containing antioxidants, which are both solid at 20° C.

JP 2008-266393 describes a saturated hydrocarbon-based, cross-linked rubber which is produced using an organic polymer having a main chain skeleton composed of a saturated hydrocarbon polymer molecule and having more than one alkenyl group in one molecule; a compound having at least two hydrosilyl groups in one molecule; a hydrosilylation catalyst; a hindered phenolic antioxidant; and a sulphur-based antioxidant.

JP H1-240544 describes a composition with resistance to heat deterioration, comprising a crystalline propylene polymer, a partially hindered phenolic antioxidant, a thioether-based antioxidant and a hydrotalcite.

By way of explanatory background, currently peroxide cross-linked polyethylenes for wire and cable insulation purposes are stabilized predominantly by a single stabilizer approach as illustrated in US 2002/0198344, more particularly, a stabilizer with combined phenol and sulphur functionality (e.g. 4,4'-thiobis (2-t-butyl-5-methylphenol) (LOWINOX® TBM-6).

Alternatively, such cross-linked polyethylenes are stabilized by a two component system having a highly hindered phenol and a thiosynergist (sulphur containing compound), e.g., 2,2'-thiodiethylene bis[3(3,5-di-butyl-4-hydroxyphenyl)propionate] (ANOX® 70), and distearyl 3,3'-thiopropionate (NAUGARD® DSTDP) or di(tridecyl thiodipropionate (NAUGARD® DTDTDP).

TBM-6 provides excellent protection against scorch and ensures good long term stability of the cable. It also gives limited interaction with the peroxide cross-linking process ensuring a high cross-link density. Thus, it provides a very good combination of high anti-scorch, good long term stability, and limited peroxide interaction. It is usually added between 0.1 and 0.5%, depending upon the end use requirements. However, TBM-6 is a one component system and also a solid, and there it would be advantageous to provide an alternative effective multi-component system which can more readily be tailored to meet the requirements of particular manufacturers.

WO 00/02207 discloses that peroxide cross-linked polyethylenes as insulating layers for wire and cable purposes can be stabilized by a two component system based on 2,2'-thiodiethylene bis[3(3,5-di-t-butyl-4-hydroxyphenyl) propionate] (ANOX® 70) and distearyl 3,3'-thiopropionate (NAUGARD® DSTDP), usually at a total loading of about 0.4% total in a 1:1 ratio. This stabilizer system overcomes the problem of blooming, which would negatively affect the shelf life of the system, but it performs insufficiently in anti-scorch and provides poorer long term stability of the cable.

There are numerous disadvantages associated with these and other prior art insulation compositions, namely, unfavourable interactions between the stabiliser and peroxide, low cross-linking speed, low maximum torque in the cross-linked compound in some cases, insufficient degree cross-linking of the polymer, and sometimes low scorch resistance.

Consequently there is a clear need in industry for a tailor-made stabilizing composition that would optimize the desired properties and would be a much needed improvement over currently available stabilizing systems.

SUMMARY

According to a first aspect of the present invention, there is provided a stabilising composition, comprising:
(a) a first stabilising component comprising at least one fully hindered phenolic antioxidant;
(b) a second stabilising component comprising at least one partially hindered phenolic antioxidant; and
(c) a third stabilising component comprising at least one sulphur-containing antioxidant.

The stabilising composition may have a melting point of about 100° C. or lower, about 90° C. or lower, about 80° C. or lower, about 70° C. or lower, about 60° C. or lower, about 50° C. or lower, about 40° C. or lower, or about 30° C. or lower, at atmospheric pressure i.e. 101.325 kPa.

The stabilising composition may be a liquid composition, in which case it may have a melting point below 50° C., preferably below 40° C., more preferably below 30° C., at atmospheric pressure, i.e. 101.325 kPa.

Alternatively, the stabilising composition may be a solid composition, in which case it may have a melting point of 50° C. or higher, preferably 60° C. or higher, more preferably 70° C. or higher, at atmospheric pressure, i.e. 101.325 kPa.

Where the stabilising composition is a solid composition, it is preferable that the melting point of the composition is such that it is in a molten state (i.e. a liquid) at the temperature at which it is processed with a polymeric substrate.

It may be possible in some cases for one or more single components of the composition to constitute all or part of more than one of components (a) and (c) and/or (b) and (c). It is not possible, for reasons which will be apparent herein, for a single material to constitute both components (a) and (b) of the stabilising composition.

The stabilising composition in accordance with the invention may additionally comprise at least one low-hindered phenolic antioxidant and/or non-hindered phenolic antioxidant.

DETAILED DESCRIPTION OF THE EXEMPLARY EMBODIMENTS

In this specification by "fully hindered" we preferably mean that the phenolic antioxidant comprises substituent hydrocarbyl groups on both positions ortho to the phenolic —OH group, each of those substituent groups being branched at the $C_1$ and/or $C_2$ position, preferably at the $C_1$ position, with respect to the aromatic ring.

In this specification by "partially hindered" we preferably mean that the phenolic antioxidant comprises at least one substituent hydrocarbyl group ortho to the phenolic —OH group, only one of the or each substituent group being branched at the $C_1$ and/or $C_2$ position, preferably at the $C_1$ position, with respect to the aromatic ring.

In this specification by "low hindered" we preferably mean that the phenolic antioxidant comprises at least one substituent hydrocarbyl group ortho to the phenolic —OH group, none of those substituent groups being branched at the $C_1$ or $C_2$ position, preferably at the $C_1$ position, with respect to the aromatic ring.

In this specification by "non-hindered" we preferably mean that the phenolic antioxidant comprises no substituent hydrocarbyl groups ortho to the phenolic —OH group.

Illustratively below, we provide by way of example only representations of the types of structural unit present in the antioxidants used in the stabilising compositions of the invention. In case it is not apparent, we emphasise that these structures do not necessarily represent the entire chemical structure of the antioxidants used in the invention; merely of the critical structural unit embodied by the phenolic group and the ortho substituents, if any. It should be apparent that these structural units may form parts of larger compounds—so the aromatic group may for example carry one or more further substituents at the meta and/or para positions, and the ortho substituents may themselves be further substituted, and in any event are not limited to methyl, α-methyl styryl and t-butyl groups as illustrated below, and may for example comprise isopropyl groups, amyl groups or other hydrocarbyl groups including cyclic and aromatic groups, optionally substituted as explained above.

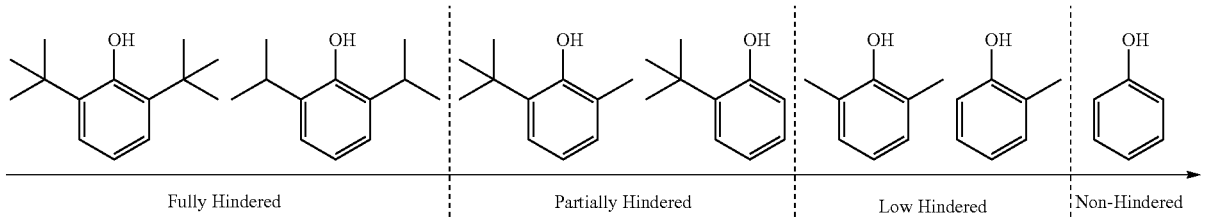

Fully Hindered | Partially Hindered | Low Hindered | Non-Hindered

The stabilising composition is formulated to be compatible with one or more polymeric materials to form a stabilised insulation composition in accordance with the invention. The insulation composition may be suitable for insulating wire and cable, for example.

The inventors of the present invention have surprisingly found that a stabilising composition comprising stabilising components (a), (b) and (c) has a reduced interaction with crosslinking agents such as organic peroxides. This has various advantages when forming a stabilised insulation or semi-conductive composition. In particular, an insulation or semi-conductive composition stabilised with the stabilising composition of the present invention has improved scorch resistance, a faster polymer crosslinking speed, a higher maximum torque during extrusion and good long term stability.

The inventors have surprisingly found that by balancing a stabilising composition with a suitable combination of materials as described above, it has been possible to produce insulation/semi-conductive compositions comprising those stabilising compositions which exhibit good scorch resistance whilst allowing the stabilised insulation/semi-conductive composition to cross-link rapidly and effectively when extruded.

Without wishing to be bound by such theory, the inventors believe that in designing a stabilising composition for use in the applications as described herein it is important to have regard both to the kinetic and thermodynamic characteristics of the antioxidant blend used in the stabilising compositions of the invention.

When the crosslinking agent used to facilitate crosslinking of the polymer in the extrudate is a peroxide, the mechanism by which phenolic antioxidants interact with the crosslinking agent to control the crosslinking reaction is via oxygen free radical formation on the phenolic group of the antioxidant. Generally speaking, a relatively more hindered phenolic compound will have greater thermodynamic stability in its radicalised state, but will be slower to reach that state than a relatively less hindered phenolic compound.

By selecting a tailored mixture of at least two phenolic antioxidants, one of which is fully hindered and the other of which is partially hindered (in combination with a thiosynergist antioxidant) we are able substantially to prevent or hinder premature crosslinking of the polymer in the extruder (benefitting from the relatively rapid kinetics of the interaction between the partially hindered phenolic antioxidant and the crosslinking agent) and yet provide (with the aid of the thermodynamic stability of the fully hindered phenolic antioxidant) long term stabilisation, for example with respect to heat aging and crosslinking efficiency.

Furthermore, the use of a blend of materials as described herein in a stabilising composition according to the invention allows greater freedom to tailor the exact properties of the composition to meet the individual requirements of the commercial use with respect to the type polymer or crosslinking agent, the presence of other additives, or the extrusion conditions for example, than would be the case for the industry standard single-component systems TBM-6 and KV-10. We do disclose multi-component systems in our WO 2006/114283, but the compositions of the present invention are differently constituted and show significant performance improvements particularly with respect to the level of interaction with the crosslinking agent, with consequent beneficial effects with regard to both cross-linking speed and the degree of crosslinking.

We also find other advantages over prior art compositions such as better compatibility with polymer substrates—in particular with liquid compositions according to the invention, which avoid some of the problems associated with solid stabilising components, e.g. blooming.

Other advantages of stabilising compositions according to the invention include their relative lack of rapid interaction with the crosslinking agent, which means that the stabilising composition of the invention may be pre-blended with the crosslinking agent and then stored prior to use without adversely impacting the efficiency of the crosslinking agent once injected into the melt. Furthermore, reduced interaction of the stabilising composition with the crosslinking agent facilitates the crosslinking process, resulting in higher torque in the cross linked product and a faster crosslinking speed during processing.

Another advantage of the liquid stabilising compositions according to the invention is that they may be able to form stable liquid mixtures with one or more liquid peroxides, for example 2,5-dimethyl-2,5-di(tert-butylperoxy)hexane (Luperox® 101—CAS 78-63-7), and/or tert-butylcumylperoxide (Luperox® 801—CAS 3457-61-2), at low temperatures, for example as low as −20° C. This provides a processing advantage for cable manufactures who operate in a "cold-production" environment.

Conversely, a mixture of KV-10 and liquid peroxide(s) will solidify at a much higher temperature, for example at 4° C. Thus, a cable manufacturer will need to maintain the mixture at a higher temperature (e.g. above freezing point) during manufacture, which is not always practical.

In some cases the antioxidant blends provided in the stabilising composition of the invention are selected to provide liquid stabilising compositions—i.e. compositions which melt below 50° C., preferably below 40° C., more preferably below 30° C. Often this will be achieved by selecting individual antioxidant stabilising components which are themselves liquid below on or both of those temperatures. By way of specific and non-limiting examples, stabilising component (a) may for example comprise one or more of C13-C15 linear and branched alkyl esters of 3-(3'5'-di-t-butyl-4'-hydroxyphenyl) propionic acid (ANOX® 1315—CAS 171090-93-0); octadecyl 3-(3',5'-di-t-butyl-4'-hydroxyphenyl) propionate (ANOX® PP18—CAS 2082-79-3); N,N'-hexamethylene bis[3-(3,5-di-t-butyl-4-hydroxyphenyl)propionamide] (LOWINOX® HD98—CAS 23128-74-7); C9-C11 linear and branched alkyl esters of 3-(3',5'-di-t-butyl-4'-hydroxyphenyl)propionic acid (NAUGARD® PS48—CAS 125643-61-0); butylated hydroxytoluene (BHT—CAS 128-37-0); 2,6-di-tertiary-butyl-4-sec-butylphenol (Isonox® 132); 2,6-di-tertiary-butyl-4-nonylphenol (Isonox® 232) and/or compatible mixtures of two or more thereof.

In other cases the antioxidant blends provided in the stabilising composition of the invention are selected to provide solid stabilising compositions—i.e. compositions which melt at 50° C. or higher, preferably 60° C., more preferably 70° C. or higher.

Even when liquid compositions are desired, it may be possible to formulate those compositions including solid materials by appropriate blending/dissolution. Stabilising component (a) may not necessarily comprise a single material but may instead itself comprise a suitable blend of materials. In that case it may be possible even when formulating a liquid composition to include in the blend one or more hindered phenolic antioxidants which are not themselves liquid at the temperature(s) specified but which nevertheless may be blended with one or more other compatible liquid antioxidants to yield a stabilising composition which is itself liquid at the specified temperature(s). Specific, non-limiting examples of such materials include tetrakismethylene(3,5-di-t-butyl-4-hydroxyhydrocinnamate) methane (ANOX® 20—CAS 6683-19-8); octadecyl 3-(3',5'-di-t-butyl-4'-hydroxyphenyl) propionate (ANOX® PP18—CAS 2082-79-3); 1,3,5-tris(3,5-di-t-butyl-4-hydroxybenzyl) isocyanurate (ANOX® IC14—CAS 27676-62-6); 1,2-bis(3,5-di-t-butyl-4-hydroxyhydrocinnamoyl)hydrazine (LOWINOX® MD24—CAS 32687-78-8); 2,2'thiodiethylene bis[3(3,5-di-t-butyl-4-hydroxyphenyl) propionate] (ANOX® 70—CAS 41484-35-9); 1,3,5-trimethyl-2,4,6-tris(3,5-di-t-butyl-4-hydroxybenzyl)benzene (ANOX® 330—CAS 1709-70-2); butylated hydroxytoluene; and/or compatible mixtures of two or more thereof.

The aforesaid materials, or any of them, as well as other phenolic antioxidants falling with the general definition herein with respect to stabilising component (a) may also be used to formulate solid stabilising compositions in accordance with the invention.

One particularly preferred stabilising component (a) comprises C13-C15 linear and branched alkyl esters of 3-(3'5'-di-t-butyl-4'-hydroxyphenyl) propionic acid (ANOX® 1315—CAS 171090-93-0).

Stabilising component (a) may be present in the stabilising composition in an amount of from about 15% to about 45% by weight of stabilising composition. Preferably, stabilising component (a) is present in an amount of from about 20% to about 40% by weight of stabilising composition, more preferably from about 25% to about 35% by weight of the stabilising composition.

Stabilising component (b) may comprise one or more partially hindered phenolic antioxidants. As has been emphasised, the antioxidant blends provided in the stabilising composition of the invention may be selected to provide liquid stabilising compositions—i.e. compositions which melt below 50° C., preferably below 40° C., more preferably below 30° C. Often this will be achieved by selecting individual antioxidant stabilising components which are themselves liquid below on or both of those temperatures. By way of specific and non-limiting examples, stabilising component (b) may comprise: 2-(1,1-dimethylethyl)-4,6-dimethyl-phenol (LOWINOX® 624—CAS 1879-09-0); 6-tert-butyl-2-methylphenol, (CAS 2219-82-1); and/or compatible mixtures thereof.

However, as has been made clear, stabilising component (b) may not necessarily comprise a single material but may instead itself comprise a suitable blend of materials. In that case it may be possible even when formulating a liquid composition to include in the blend one or more partially hindered phenolic antioxidants which are not themselves liquid at the temperature(s) specified but which nevertheless may be blended with one or more other compatible liquid antioxidants to yield a stabilising composition which is itself liquid at the specified temperature(s). Specific, non-limiting examples of such materials include 4,6-di-tert-butyl-2-methylphenol, 6-tert-butyl-2-methylphenol, 2-tert-butyl-4-methylphenol, 2-tert-butyl-5-methylphenol, 2,4-di-tert-butylphenol; 2,4-di-tert-pentylphenol); triethyleneglycol-bis-[3-(3-t-butyl-4-hydroxy-5-methylphenyl)propionate] (LOWINOX® GP45—CAS 36443-68-2); 1,3,5-tris(4-t-butyl-3-hydroxyl-2,6-dimethylbenzyl)-1,3,5-triazine-2,4,6-(1H, 3H, 5H)-trione (LOWINOX® 1790); 2,2'-ethylidenebis[4,6-di-t-butylphenol] (ANOX® 29—CAS 35958-30-6); 2,2'methylenebis(6-t-butyl-4-methylphenol) (LOWINOX® 22M46—CAS 119-47-1); and/or compatible mixtures of two or more thereof.

The aforesaid materials, or any of them, as well as other phenolic antioxidants falling with the general definition herein with respect to stabilising component (b) may also be used to formulate solid stabilising compositions in accordance with the invention—i.e. which melt at 50° C. or higher, preferably at 60° C. or higher, more preferably at 70° C. or higher.

It is required that stabilising component (b) comprise at least one partially hindered phenolic antioxidant as defined herein. Stabilising component (b) may additionally comprise at least one further stabilising component (b$^{optional}$) selected from one or more low or non-hindered phenolic antioxidants such as 4-tert-pentyphenol, the butylated reaction product of p-cresol and dicyclopentadiene (LOWINOX® CPL—CAS 68610-51-5), or 2,6-xylenol, for example.

Stabilising component (b) may be present in the stabilising composition in an amount of from about 1% to about 40% by weight of stabilising composition. Preferably, stabilising component (b) is present in an amount of from about 5% to about 30% by weight of stabilising composition, more preferably from about 10% to about 20% by weight of the stabilising composition.

Stabilising component (c) may comprise one or more thioesters. As has been emphasised, the antioxidant blends provided in the stabilising composition of the invention may be selected to provide liquid stabilising compositions—i.e. compositions which melt below 50° C., preferably below 40° C., more preferably below 30° C. Often this will be achieved by selecting individual antioxidant stabilising components which are themselves liquid below on or both of those temperatures. By way of specific and non-limiting examples, stabilising component (c) may comprise: ditridecylthiodipropionate (NAUGARD® DTDTDP (liquid) CAS—10595-72-9); 2,4-bis(n-octylthiomethyl)-6-methylphenol (Irganox® 1520—CAS 110533-27-0); and/or compatible mixtures of two or more thereof.

As with components (a) and (b) stabilising component (c) may not necessarily comprise a single material but may instead itself comprise a suitable blend of materials. In that case even when formulating a liquid stabilising composition it may be possible to include in the blend one or more sulphur containing antioxidants which are not themselves liquid at the temperature(s) specified but which nevertheless may be blended with one or more other compatible liquid antioxidants to yield a stabilising composition which is itself liquid at the specified temperature(s). Specific, non-limiting examples of such materials include pentaerythritol tetrakis (β-laurylthiopropionate) (NAUGARD® 412S—CAS 29598-76-3); dilauryl-3,3'-thiodipropionate (NAUGARD® DLTDP—CAS 123-28-4); distearyl-3,3'-thiodipropionate (NAUGARD® DSTDP—CAS 693-36-7); 2,2'thiodiethylene bis[3(3,5-di-t-butyl-4-hydroxyphenyl)propionate] (ANOX® 70—CAS 41484-35-9); dimyristyl thiodipropionate (Cyanox® MTDP—CAS 16545-54-3); distearyl-disulfide (Hostanox® SE 10—CAS 2500-88-1); and/or compatible mixtures of two or more thereof.

The aforesaid materials, or any of them, as well as other phenolic antioxidants falling with the general definition herein with respect to stabilising component (c) may also be used to formulate solid stabilising compositions in accordance with the invention—i.e. which melt at 50° C. or higher, preferably at 60° C. or higher, more preferably at 70° C. or higher.

One particularly preferred stabilising component (c) comprises ditridecylthiodipropionate (NAUGARD® DTDTDP (liquid) CAS-10595-72-9). Another particularly preferred stabilising component (c) comprises 2,4-bis(n-octylthiomethyl)-6-methylphenol (Irganox® 1520—CAS 110533-27-0).

Stabilising component (c) may be present in the stabilising composition in an amount of from about 20% to about 80% by weight of the stabilising composition, preferably from about 30% to about 75% by weight, more preferably from about 40% to about 70% by weight, and most preferably from about 50% to about 60% by weight of the stabilising composition.

Preferably the ratio of the stabilising components (a):(b):(c) in the stabilising composition is (from about 1 to about 3):(from about 0.01 to about 2):(from about 2 to about 6):preferably (from about 1.5 to about 2.5):(from about 0.05 to about 1.5):(from about 3 to about 5). A particularly preferred ratio is in the region of 2:1:4.

Advantageously, stabilising compositions according to the present invention may be food contact compliant. By "food contact compliant" we mean that the stabilising composition meets the criteria defined in the framework regulation EC 1935/2004 and/or that a plastic material and/or article comprising the stabilising composition meets the criteria defined in regulation EU 10/2011.

A particularly preferred food contact compliant stabilising composition comprises octadecyl 3-(3',5'-di-t-butyl-4'-hydroxyphenyl) propionate (ANOX® PP18—CAS 2082-79-3); triethyleneglycol-bis-[3-(3-t-butyl-4-hydroxy-5-methylphenyl)propionate] (LOWINOX® GP45—CAS 36443-68-2); and dilauryl-3,3'-thiodipropionate (NAUGARD® DLTDP—CAS 123-28-4).

The stabilising composition of the invention is blended in use with a polymeric substrate such as polyethylene, for example LDPE, which may be blended with or replaced in whole or in part with one or more of EVA, EBA, EMA, EEA, MAH, EPR or polymers formed from ethylene propylene diene monomers, to form an insulation or semi-conductive composition in accordance with the invention. The insulation/semi-conductive composition may also comprise further components, such as peroxide crosslinking agents and stabilisers. In the insulation/semi-conductive composition the stabilising composition of the invention is preferably present in an amount of from about 1000 to about 5000 ppm, more preferably from about 1000 to about 4000 ppm, and most preferably from about 2000 to about 3500 ppm.

According to a second aspect of the present invention, there is provided a stabilised insulation or semi-conductive composition, comprising:
(a) a polymeric base material;
(b) a cross linking agent; and
(c) a stabilising composition as described herein.

The polymeric base material may comprise a polyolefin. The polyolefin may comprise a homopolymer of ethylene. The ethylene homopolymer may comprise low density polyethylene (LDPE), linear low density polyethylene (LLDPE) and/or high density polyethylene (HDPE).

The polyolefin may comprise vinyl groups. The polyolefin may comprise vinyl groups/1000 carbon atoms in an amount of 0.15/1000 carbon atoms or more, 0.20/1000 carbon atoms or more, 0.25/1000 carbon atoms or more, or 0.30/1000 carbon atoms or more, and less than 4.0/1000 carbon atoms, or less than 3.0/1000 carbon atoms.

The polyolefin comprising vinyl groups may comprise polyethylene, for example low density polyethylene.

Additionally or alternatively, the polyolefin may comprise a copolymer of ethylene and one or more alpha-olefins. The alpha-olefin may comprise between 3 and 12 carbon atoms, for example, propylene, butene, pentene, hexene, heptene and octene. The copolymer may be a random copolymer or a block copolymer.

Preferably the polyolefin comprises a low density polyethylene homopolymer.

High pressure polyethylenes, for example homopolymers of ethylene having a density in the range of from about 0.910 to about 0.930 g/cm$^{-3}$, are for example suitable for use in this connection. Such polymers may have a melt index (determinable under the conditions set out in ASTM D-1238) of from about 1 to about 5 g per 10 minutes, or from about 0.75 to about 3 g per 10 minutes.

In some cases other polymers or rubber materials can be used (alone or in combination) as well as or instead of (LD)PE—for example, EVA, EBA, EMA, EEA, MAH, ethylene propylene rubber (EPR) or rubbers, styrene butadiene rubber (SBR), polybutadiene rubber, polyurethane rubber or polymers made from ethylene propylene diene monomers. When used at all these polymers or rubbers are most often used in combination with (LD)PE, typically in quantities of up to 15% w/w with respect to the (LD)PE. In some cases these polymers or rubbers or some of them, e.g. EPR and polymers or rubbers of EPDM, can be used instead of (LD)PE. The polyethylene or LDPE may comprise a single compound or suitable blends of materials, including for example metallocene catalysed (LD)PEs.

The crosslinking agent is preferably a peroxide, more preferably an organic peroxide. It is known that when organic peroxides are exposed to increased temperatures, they thermally decompose to generate free radicals. The free radicals can subsequently form active sites on a polymer backbone. The reaction between two active sites on different polymer molecules will create a strong carbon-carbon bond between the molecules. This results in a polymer material with increased stability and/or improved mechanical properties.

The organic peroxide useful as a crosslinking agent may be any organic peroxide well known in the art for this purpose. In particular, the organic peroxide may comprise a dialkyl peroxide, for example dicumyl peroxide (CAS 80-43-3), 2,5-dimethyl-2,5-di(tert-butylperoxy)hexane (CAS 78-63-7) and/or tert-butylcumylperoxide (CAS 3457-61-2). Preferably, the organic peroxide has a decomposition temperature in the range of from about 100° C. to about 200° C.

The crosslinking agent may be present in an amount of from about 0.5% to about 5% by weight of the stabilised insulation or semi-conductive composition. Preferably, the crosslinking agent is present in an amount of from about 1° A to about 3% by weight of the stabilised insulation or semi-conductive composition.

The stabilising composition may additionally comprise further functional components such as water tree retardants.

The water tree retardant may be present in an amount of from about 100 to about 5000 ppm of the stabilised insulation or semi-conductive composition. Preferably, the water tree retardant is present in an amount of from about 200 to about 4000 ppm, from about 300 to about 3000 ppm, from about 400 to about 2000 ppm, from about 500 to about 1500 ppm, from about 600 to about 1400 ppm, from about 700 to about 1300 ppm, from about 800 to about 1200 ppm or from about 900 to about 1100 ppm of the stabilised insulation or semi-conductive composition.

Advantageously, the stabilised insulation or semi-conductive compositions according to the present invention may be food contact compliant. By "food contact compliant" we mean that the stabilised insulation or semi-conductive compositions meet the criteria defined in the framework regulation EC 1935/2004 and/or that the stabilised insulation or semi-conductive compositions meet the criteria defined in regulation EU 10/2011.

According to a third aspect of the present invention, there is provided a process for forming a stabilised insulation or semi-conductive composition, comprising the steps of:
a. providing a stabilising composition as described herein;
b. combining the stabilising composition or its components with a polymer and a crosslinking agent;
c. forming a melt from the polymer; and
d. extruding the melt, optionally in the form of a wire or cable insulation sleeve.

The stabilising composition or any of its components and/or the crosslinking agent may be combined with the polymer before, after or during formation of the melt.

Two or more, or all, of the components of the stabilising composition may be pre-blended prior to step b., or, in some cases may be injected into the melt or combined with the polymer separately.

This process, particularly the pre-blending step when present, may occur at low temperatures. Preferably, the pre-blending step when present is carried out at a temperature between 0 and 50° C.

Advantageously, the stabilising composition of the present invention has a reduced interaction with the crosslinking agent. Due to the reduced interaction between the stabilising composition and the crosslinking agent, the level of crosslinking of the polymer may be significantly increased. This results in an insulation/semi-conductive composition with increased stability.

In addition, the reduced interaction means the crosslinking agent and the stabilising composition of the present invention can be pre-blended and stored under ambient conditions for a longer period of time than has been possible with certain prior art compositions.

A further advantage of the present invention is that as a result of the minimised/reduced interaction between inventive antioxidant composition and the crosslinking agent, the polymer crosslinks at a higher speed, and consequently the insulation/semi-conductive composition can be extruded at a faster speed. This may lead to a reduction of production line length and/or increased extrusion speed.

According to a fourth aspect of the present invention, there is provided an extruded and stabilised insulation or semi-conductive composition, comprising an extrudate of a polymeric melt comprising a polymer, a cross linking agent and a stabilising composition as described herein.

According to a fourth aspect of the present invention, there is provided a wire or cable surrounded by or surrounding a stabilised insulation or semi-conductive composition as described herein.

The invention also concerns a useful article comprising the wire or cable described herein.

Also provided is the use of the wire or cable as described herein in an electrical system.

The invention is more specifically described by the following non-limiting examples.

The embodiments disclosed below are not intended to be exhaustive or limit the disclosure to the precise forms disclosed in the following detailed description. Rather, the embodiments are chosen and described so that others skilled in the art may utilize their teachings.

Examples

Sample Preparation

The selected stabilising composition, an organic peroxide crosslinking agent and a low density polyethylene (d=0.923 g/cm$^3$), ALCUDIA® PE-003 from Repsol S.A. are individually pre-heated to 80° C. and then combined with the aid of a rotary mixer and subsequently dried before further use.

Scorch Time 43 g of the resulting dried sample were stir melted at 30 rpm in a lab kneader, type Brabender Plasticorder 814 300, at an initial mass temperature of 130° C. The material is kneaded under a constant load of 2.0 kg and the torque is monitored. The scorch time is determined as the period between minimum torque and an increase by 1 Nm starting from the minimum torque. A longer scorch time means reduced risk of premature crosslinking during extrusion.

Crosslinking Procedure

The production of crosslinked PE-LD plaques (thickness: 1.5 mm) is carried out in three compression molders at different temperatures: A prepared sample as referenced above is distributed in a compression mold, heated to 120° C. for six minutes whilst the pressure is gradually increased from 0 to 150 bar. The resulting plaques are transferred to a second compression mold and at 180° C. for 15 min for crosslinking to complete, and then cooled to provide sample plaques.

Thermal Aging, Elongation and Tensile Strength

Tensile bars (dimensions according to DIN 53-504-82) are punched from the crosslinked plaques and split into three sets for oven aging at 150° C. for 0, 10 and 14 days. The tensile bars are evaluated for retention of tensile strength and elongation (yield; break). Mechanical tests conditions are in accordance with ASTM D 638.

Crosslinking Speed & Maximum Torque in the Rheometer 3 g of each sample are heated to 180° C. in a Moving Die Rheometer (Rheotech). The samples are exposed to a periodical alternating stress at constant amplitude (0.5° torsion at 1.66 Hz) until the maximum torque is obtained, and the crosslinking speed is determined.

In the following Examples, the results of which are displayed in Tables I-VI, the stabilising compositions used are as follows:

Comparative C1=4,4-Thiobis(2-t-butyl-5-methylphenol) (=TBM-6)

Comparative C2=mixture of 50 wt % 2,2-Thiodiethylene bis[3-(3,5-di-t-butyl-4-hrdroxyphenyl)propionate] (=ANOX® 70) and 50 wt % Distearyl thiodipropionate (=DSTDP)

Comparative C3=4,6 bis(octylthiomethyl)-o-cresol (=KV-10)

Invention 1=mixture of 57 wt % di(tridecyl) 3,3'-thiodipropionate, 29 wt % 3,5-Bis-(1,1-dimethylethyl)-4-hydroxy-benzenepropanoic acid alkyl-(C13-C15) and 14 wt % 6-tert-butyl-2-methylphenol Invention 2=mixture of 57 wt % di(tridecyl) 3,3'-thiodipropionate, 29 wt % 3,5-Bis-(1,1-dimethylethyl)-4-hydroxy-benzenepropanoic acid alkyl-(C13-C15) and 14 wt % 6-tert-butyl-2,4-xylenol Invention 3=mixture of 39.5 wt % dilauryl-3,3'-thiodipropionate, 23 wt % octadecyl 3-(3',5'-di-t-butyl-4'-hydroxyphenyl) propionate and 37.5 wt % triethyleneglycol-bis-[3-(3-t-butyl-4-hydroxy-5-methylphenyl)propionate].

These examples and comparative examples may be considered as comprising one or more of components A, B and C required by the invention as set out in Table I:

TABLE I

| Example | Component A | Component C | Component B |
|---|---|---|---|
| C1 | n/a | 4,4-thiobis(2-butyl-5-methylphenol (=TBM-6) | |
| C2 | | 50 wt % distearyl thiodipropionate (=DSTDP) | n/a |
| | 50 wt % 2,2-thiodiethylene bis[3-(3,5-di-t-butyl-4-hydroxyphenyl)propionate] (=ANOX ® 70) | | |
| C3 | n/a | 4,6 bis (octothiomethyl)-o-cresol (=KV10) | n/a |

TABLE I-continued

| Example | Component A | Component C | Component B |
|---|---|---|---|
| 1 | 29 wt % 3,5-bis-(1,1-dimethylethyl)-4-hydroxybenzenepropanoic acid-(C13-C15) | 57 wt % di(tridecyl) 3,3'-thiodipropionate | 14 wt % 6-tert-butyl-2-methylphenol |
| 2 | 29 wt % 3,5-bis-(1,1-dimethylethyl)-4-hydroxybenzenepropanoic acid-(C13-C15) | 57 wt % di(tridecyl) 3,3'-thiodipropionate | 14 wt % 6-tert-butyl-2,4-xylenol |
| 3 | 23 wt % octadecyl 3-(3',5'-di-t-butyl-4'-hydroxyphenyl) propionate | 39.5 wt % dilauryl-3,3'-thiodipropionate | 37.5 wt % triethyleneglycol-bis-[3-(3-t-butyl-4-hydroxy-5-methylphenyl)propionate] |

Examples C1, C2 and C3 are comparative examples. Examples 1, 2 and 3 are in accordance with the invention. As will be apparent, certain materials (TBM-6 for example) may fall within more than one of the categories A, B, C defined as necessary components of the invention. Comparative Example C3 may be considered to comprise both Component C (a sulphur-containing antioxidant) and a low hindered phenolic antioxidant since KV10 contains as well as two thioalkyl groups a phenolic—OH with a methyl group ortho thereto. However it does not contain a partially hindered phenolic antioxidant as required by this invention.

The Experimental results are set out in the following tables.

TABLE II

| Ex. | Loading | Scorch Time | Cure Efficiency Index | Maximum Speed | Maximum Torque | physical form |
|---|---|---|---|---|---|---|
| C1 | 0.20 wt % | 17 min | 0.26 dNm | 1.23 | 3.05 dNm | solid |
| C2 | 0.30 wt % | 9 min | 0.37 dNm | 1.18 | 3.02 dNm | solid |
| C3 | 0.30 wt % | 16 min | 0.36 dNm | 0.87 | 2.45 dNm | liquid |
| 1 | 0.25 wt % | 10.5 min | 0.26 dNm | 1.55 | 3.67 dNm | liquid |
| 1 | 0.30 wt % | 13 min | 0.26 dNm | 1.35 | 3.36 dNm | liquid |
| 2 | 0.30 wt % | 13 min | 0.24 dNm | 1.40 | 3.35 dNm | liquid |
| 2 | 0.33 wt % | 14.5 min | 0.26 dNm | 1.38 | 3.41 dNm | liquid |
| 2 | 0.35 wt % | 16 min | 0.44 dNm | 1.31 | 3.29 dNm | liquid |
| 3 | 0.36 wt % | 8 min | 0.32 dNm | 1.52 | 3.62 dNm | solid |

It will be seen that compositions in accordance with the invention exhibit scorch times which equal, approach or exceed those exhibited by the current industry standards as exemplified in C1-C3, and therefore range from being highly satisfactory, through to excellent. Maximum torque levels in the case of the inventive compositions exceed the industry standards, demonstrating a high degree of crosslinking in the polymer and a commensurate low level of interference by the stabilising composition of the invention with the crosslinker or the crosslinking reaction.

TABLE III

| Ex. | Loading | Tensile Strength after crosslinking | Retained Tensile strength after thermal aging at 150° C./10 days | Heat Elongation |
|---|---|---|---|---|
| C1 | 0.20% | 24.1 MPa | 23.6 MPa | 68% |
| C2 | 0.30% | 23.9 MPa | 23.6 MPa | 58% |
| C3 | 0.30% | 21.4 MPa | 23.0 MPa | 63% |
| 1 | 0.25% | 20.7 MPa | 20.7 MPa | 58% |
| 1 | 0.30% | 20.4 MPa | 21.3 MPa | 62% |
| 2 | 0.30% | 22.0 MPa | 22.9 MPa | 66% |
| 2 | 0.33% | 23.6 MPa | 24.3 MPa | 62% |
| 2 | 0.35% | 21.2 MPa | 23.2 MPa | 67% |
| 3 | 0.36% | 21.3 MPa | 20.4 MPa | 50% |

It will be seen that the tensile strength of the inventive compositions both before and after thermal aging, and the heat elongation exhibited by these materials is comparable with the industry standard compositions.

TABLE IV

| | Maximum Torque, MH | | | | | |
|---|---|---|---|---|---|---|
| | Ex. 1 3000 ppm | | Ex. 2 3000 ppm | | Ex. C3 3000 ppm | |
| Time point | 4° C. | RT | 4° C. | RT | 4° C. | RT |
| 0 | 1.41 | 1.38 | 1.50 | 1.55 | 0.85 | 0.93 |
| 1 hr | 1.65 | 1.49 | 1.58 | 1.49 | 1.20 | 1.12 |
| 1 day | 1.56 | 1.45 | 0.87 | 0.94 | 0.59 | 0.78 |
| 1 week | 1.63 | 1.59 | | | | |

TABLE V

| | Maximum Speed, MS | | | | | |
|---|---|---|---|---|---|---|
| | Ex. 1 3000 ppm | | Ex. 2 3000 ppm | | Ex. C3 3000 ppm | |
| Time point | 4° C. | RT | 4° C. | RT | 4° C. | RT |
| 0 | 0.25 | 0.26 | 0.26 | 0.28 | 0.20 | 0.16 |
| 1 hr | 0.21 | 0.27 | 0.24 | 0.23 | 0.19 | 0.18 |
| 1 day | 0.26 | 0.24 | 0.25 | 0.26 | 0.10 | 0.13 |
| 1 week | 0.27 | 0.27 | 0.27 | 0.30 | | |

Data from table IV and V discloses the stability of liquid AO & peroxide stored in 4° C. and at room temperature (intended to replicate different storage conditions likely to be found in relatively cold and temperate climates. The data shows that, over time, the maximum torque and crosslinking speed of the comparative example (KV-10) drops dramatically, which leads to much lower degree of crosslinking, i.e. the LDPE was not cross linked up to the desired level to meet the industry standard.

However, the inventive compositions exhibited much higher crosslinking speed and maximum torque, indicating a high degree of crosslinking.

These advantages can allow manufacturers of insulation wires and cables, or extrudates therefor, to pre-blend the stabilising composition of the invention with the crosslinking agent considerably before the extrusion process takes place. These benefits translate into operation flexibility, reduced or eliminated waste of raw materials, and the ability more precisely or easily to control dosing of the combined antioxidant/crosslinking agent composition by dosing as a single blend rather that as separate components.

The inventive compositions exhibit significant stability with peroxide at both 4° C. and room temperature over a long period. The stability is demonstrated by the maintenance of both maximum crosslinking speed and maximum torque over time for the inventive compositions.

TABLE VI

| Ex. | Loading | Elongation after crosslinking | Retained Elongation after thermal aging at 150° C./10 days |
|---|---|---|---|
| C1 | 0.20% | 622.9% | 675.3% |
| C2 | 0.30% | 611.6% | 663.6% |
| C3 | 0.30% | 615.3% | 699.3% |
| 1 | 0.25% | 613.2% | 649.78% |
| 1 | 0.30% | 590.2% | 646.4% |
| 2 | 0.30% | 644.4% | 662.1% |
| 2 | 0.33% | 633.2% | 653.5% |
| 2 | 0.35% | 617.8% | 654.5% |
| 3 | 0.36% | 628.3% | 597.3% |

It will be seen that the tensile strength of the inventive compositions both before and after thermal aging, and the heat elongation exhibited by these materials is comparable with the industry standard compositions.

Alternative compositions in accordance with the invention were investigated with respect to scorch times

TABLE VII

| Ex. | Stabilising Composition | Ratio | Dosage (ppm) | Scorch Time |
|---|---|---|---|---|
| 3 | NAUGARD ® DTDTDP & ANOX ® 1315 & LOWINOX ® 624 | 10:4:1 | 3000 | 10 |
| 4 | NAUGARD ® DTDTDP & ANOX ® 1315 & LOWINOX ® 624 | 4:2:1 | 3000 | 13 |
| 5 | NAUGARD ® DTDTDP & ANOX ® 1315 & NAUGARD ® 431 | 4:2:1 | 3000 | 10 |
| 6 | NAUGARD ® DTDTDP & ANOX ® 1315 & A1 | 4:2:1 | 3000 | 13 |
| 7 | NAUGARD ® DTDTDP & ANOX ® 1315 & A2 | 4:2:1 | 3000 | 13 |
| 8 | NAUGARD ® DTDTDP & ANOX ® 1315 & A3 | 4:2:1 | 3000 | 10 |
| 9 | NAUGARD ® DTDTDP & ANOX ® 1315 & A4 | 4:2:1 | 3000 | 11 |
| 10 | NAUGARD ® DTDTDP & ANOX ® 1315 & A5 | 4:2:1 | 3000 | 10.5 |
| 11 | NAUGARD ® DTDTDP & ANOX ® 1315 & A7 | 4:2:1 | 3000 | 9 |
| 12 | NAUGARD ® DTDTDP & ANOX ® 1315 & A2 | 8:4:3 | 3000 | 13 |
| 13 | NAUGARD ® DTDTDP & ANOX ® 1315 & A6 & A7 | 12:6:2:1 | 3000 | 9 |
| 14 | NAUGARD ® DTDTDP & ANOX ® 1315 & A2 | 4:2:1 | 2500 | 10.5 |

Key to Table VII:

| NAUGARD ® DTDTDP | CAS 10595-72-9 |
|---|---|
| ANOX ® 1315 | CAS 171090-93-0 |
| LOWINOX ® 624 | CAS 1879-09-0 |
| NAUGARD ® 431 | CAS 1817-68-1 |
| A1 | 4,6-di-tert-butyl-2-methylphenol(DBOC-6 BOC by product) |
| A2 | 6-tert-butyl-2-methylphenol(6 BOC) |
| A3 | 2-tert-butyl-5-methylphenol(MBMC) |
| A4 | 2-tert-butyl-4-methylphenol(MBPC) |
| A5 | 2,4-di-tert-butylphenol |
| A6 | 4-tert-pentylphenol(PTAP) |
| A7 | 2,4-di-tert-pentylphenol(DTAP) |

The results above show, the scorch time can be tailored to suit individual manufacturer's requirements by suitably adjusting the composition. This provides a significant advantage as compared to single component prior art systems as exemplified by KV-10 and TBM-6.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

The invention claimed is:

1. A stabilising composition for a polyethylene homopolymer or copolymer, comprising:
   a. a first stabilising component consisting of one or more of C13-C15 linear and branched alkyl esters of 3-(3'5'-di-t-butyl-4'-hydroxyphenyl) propionic acid;
   b. a second stabilising component consisting of 6-tert-butyl-2-methylphenol; and
   c. a third stabilising component consisting of ditridecyl-thiodipropionate;
   wherein the stabilising composition has a melting point of about 30C or lower, at atmospheric pressure of 101.325 kPa, and
   wherein
   the first stabilising component (a) is present in an amount ranging from about 25% to about 29% by weight of the stabilising composition,
   the second stabilising component (b) is present in an amount ranging from about 14% to about 25% by weight of the stabilising composition,
   the third stabilising component (c) is present in an amount ranging from about 50% to about 57% by weight of the stabilising composition.

2. The stabilising composition according to claim 1, further comprising at least one low-hindered phenolic antioxidant and/or at least one non-hindered phenolic antioxidant.

3. The stabilising composition according to claim 1 further comprising octadecyl3-(3',5'-di-t-butyl-4'-hydroxyphenyl) propionate; N,N'-hexamethylene bis[3-(3,5-di-t-butyl-4-hydroxyphenyl)propionamide]; C9-C11linear and branched alkyl esters of 3-(3',5'-di-t-butyl-4'-hydroxyphenyl)propionic acid; butylated hydroxytoluene; 2,6-di-tertiary-butyl-4-sec-butylphenol; 2,6-di-tertiary-butyl-4-nonylphenol; tetrakismethylene(3,5-di-t-butyl-4-hydroxyhydrocinnamate) methane; 1,3,5-tris(3,5-di-t-butyl-4-hydroxybenzyl) isocyanurate; 1,2-bis (3,5-di-t-butyl-4-hydroxyhydrocinnamoyl)hydrazine; 2, 2'thiodiethylene bis [3(3,5-di-t-butyl-4-hydroxyphenyl)propionate]; 1,3,5-trimethyl-2,4,6-tris(3,5-di-t-butyl-4-hydroxybenzyl)benzene; butylated hydroxytoluene; or mixtures of two or more thereof.

4. The stabilising composition according to claim 1 further comprising 2,4-bis(n-octylthiomethyl)-6-methylphenol; pentaerythritol tetrakis ((β-laurylthiopropionate); dilauryl-3,3'-thiodipropionate; distearyl-3,3'-thiodipropionate; 2, 2'thiodiethylene bis[3(3,5-di-t-butyl-4-hydroxyphenyl)propionate]; dimyristyl thiodipropionate; distearyl-disulfide; or mixtures of two or more thereof.

5. The stabilising composition according to claim 1 wherein the stabilising composition is food contact compliant.

6. The stabilising composition according to claim 1 further comprising 2-(1,1-dimethylethyl)-4,6-dimethyl-phenol; 6-tert-butyl-2-methylphenol; 4,6-di-tert-butyl-2-methylphenol, 2-tert-butyl-4-methylphenol; 2-tert-butyl-5-methylphenol; 2,4-di-tert-butyl phenol; 2,4-di-tert-pentylphenol; triethyleneglycol-bis-[3-(3-t-butyl-4-hydroxy-5-methyl phenyl)propionate]; 1,3,5-tris(4-t-butyl-3-hydroxyl-2,6-dimethylbenzyl)-1,3,5-triazine-2,4,6-(1H, 3H, 5H)-trione; 2,2'-ethylidenebis[4,6-di-t-butylphenol]; 2,2'methylenebis (6-t-butyl-4-methylphenol); or mixtures of two or more thereof.

* * * * *